United States Patent [19]
Rosback

[11] 3,755,153

[45] Aug. 28, 1973

[54] OLEFIN SEPARATION PROCESS USING COPPER-EXCHANGED TYPE X ZEOLITE

[75] Inventor: Donald H. Rosback, Elmhurst, Ill.

[73] Assignee: Universal Oil Products Company, Des Plaines, Ill.

[22] Filed: Mar. 1, 1972

[21] Appl. No.: 230,995

Related U.S. Application Data

[63] Continuation-in-part of Ser. No. 865,979, Oct. 13, 1969, Pat. No. 3,649,176.

[52] U.S. Cl. ....... 208/310, 260/677 AD, 252/455 Z, 423/328
[51] Int. Cl. .......................... C10g 25/04, C07c 7/12
[58] Field of Search ............... 208/310; 260/677 AD

[56] References Cited
UNITED STATES PATENTS

| | | | |
|---|---|---|---|
| 3,221,073 | 11/1965 | Davis et al. | 260/677 AD |
| 3,510,423 | 5/1970 | Neuzil et al. | 208/310 |

*Primary Examiner*—Herbert Levine
*Attorney*—James R. Hoatson Jr. et al.

[57] ABSTRACT

An improved process for the separation of olefins from a hydrocarbon feed mixture containing olefins, saturates and contaminant aromatics. The improvement basically comprises employing as an adsorbent a copper-exchanged Type X zeolite which has decreased polymerization and isomerization activity and increased olefin selectivity in the presence of aromatics.

7 Claims, No Drawings

OLEFIN SEPARATION PROCESS USING COPPER-EXCHANGED TYPE X ZEOLITE

CROSS-REFERENCE TO RELATED APPLICATIONS

This application is a continuation-in-part application of copending application Ser. No. 865,979 filed Oct. 13, 1969, now U.S. Pat. No. 3,649,176 all the teachings of said copending application are incorporated herein by specific reference thereto.

BACKGROUND OF THE INVENTION

1. Field of the Invention

This invention relates to the manufacture of a zeolite adsorbent and a separation process employing the same. More specifically, this invention relates to an improved method of producing a zeolite having substantially reduced catalytic activity towards the polymerization of olefinic materials being adsorbed by the adsorbent and an increased olefin selectivity in the presence of aromatics, with no loss in olefin capacity. This invention also relates to a hydrocarbon separation process employing the improved zeolite to more effectively separate olefins from feed streams containing saturates and olefins and aromatics in an efficient manner.

2. Description of the Prior Art

It is well known in the separation art that molecular sieve sorbents can be employed to separate olefins from saturates. The adsorbents employed in the separation processes are generally crystalline aluminosilicates modified with a selective material from the groups generally consisting of the IA, IIA and IB metals of the Periodic Table of the Elements. Such a process is particularly exemplified by U. S. Pat. No. 3,510,423. In most cases, the metals are ion-exchanged onto the zeolite by known methods and generally effect an increase in capacity of the sieves for the adsorption of olefinic materials. The method of this invention places copper cations in a Type X structured zeolite to effect the reduction in polymerization and isomerization activity generally associated with the sodium form Type X structured zeolites when employed to selectively adsorb olefins from a feed stream mixture. I have found that through the use of a novel treatment that a Type X structured zeolite which has been exchanged with a first aqueous copper solution and which has been subsequently contacted with a mixture of a hydrocarbon and a cuprous salt solution, that the polymerization and isomerization activities which generally appear can be substantially eliminated leaving the sieve in a state of reduced catalytic activity.

Additionally, I have found that a partial reduction and hydration of the zeolite so prepared will further reduce polymerization activity and increase the olefin selectivity in the presence of aromatics without decreasing olefin capacity.

The prior art in general has not recognized the effects of copper on the olefins being adsorbed within a copper exchange adsorbent. Since the copper-exchange Type X structured zeolite generally causes side reactions to occur, thereby reducing the efficiency of a separation process employing that type adsorbent, the method of my invention substantially improves both the adsorbent and the process where olefinic hydrocarbons are to be separated efficiently from a feed stream. By enhancing the selectivity of this zeolite for olefins in the presence of aromatics and further reducing polymerization activity, the improvement of my invention produces both a better adsorbent and a better olefin separation process.

SUMMARY OF THE INVENTION

It is an object of the present invention to provide an improved process for the separation of olefins from a hydrocarbon feed mixture containing olefins, saturates and contaminant aromatics which process comprises the steps of contacting said feed mixture with a bed of zeolite adsorbent at adsorption conditions to effect retention of said olefins by said adsorbent, withdrawing from said bed of adsorbent a raffinate stream comprising non-retained hydrocarbons, contacting the adsorbent bed with a desorbent material at desorption conditions to effect the desorption of said olefins from said adsorbent, and withdrawing a stream containing olefins and desorbent from said bed of adsorbent. The improvement resides in using a specially prepared copper-exchanged Type X zeolite possessing decreased polymerization and isomerization activity and increased olefin/aromatic selectivity.

DESCRIPTION OF THE PREFERRED EMBODIMENT

Both the natural and synthetic varieties of the sodium Type X structured crystalline aluminosilicates may be used as starting materials in the present invention. Crystalline aluminosilicates are essentially cage structured material in which the alumina and silica tetrahedra are intimately connected with each other in an open three-dimensional crystalline network. The tetrahedra are cross-linked by the sharing of atoms of oxygen. The spaces between the tetrahedra are occupied by water molecules prior to dehydration. Subsequent partial or total dehydration of the zeolite results in a crystal structure interlaced with the channels of molecular dimensions. Thus, the crystalline aluminosilicates are often referred to as molecular sieves. In the hydrated form, crystalline aluminosilicates may be represented by the general formula represented below:

$$M_{2/n}O:Al_2O_3:wSiO_2:yH_2O$$

where M is a cation which balances the electrovalence of the tetrahedra, $n$ represents the valence of the cation, $w$ represents the mols of $SiO_2$, and $y$ the mols of water. The Type X zeolite may be represented in terms of the mol ratios of oxides for the sodium form as represented below:

$$0.9\pm0.2Na_2O:Al_2O_3:2.5\pm0.5SiO_2:YH_2O$$

where Y may be any value up to about 8.

When the sodium form of the Type X zeolite is ion-exchanged with copper, a portion or all of the sodium present within the zeolite structure may be replaced by the copper ions. The copper-exchanged Type X structured zeolites as used in this specification shall generally encompass those zeolites which have been produced according to this invention and which have had at least a portion of the sodium originally present within the zeolite replaced by a copper cation.

The anticipated use for the zeolite of this invention is in a process for the separation of olefinic hydrocarbons from a hydrocarbon mixture containing saturated hydrocarbons and olefinic hydrocarbons as particularly disclosed in U. S. Pat. No. 3,510,423. The desirable characteristics possessed by the zeolite of this invention and its particular usefulness can be further elucidated by brief reference to the process.

In separating the olefinic hydrocarbon from the feed mixture, the feed is contacted with a bed of the copper-exchanged sodium Type X structured zeolite, the olefinic hydrocarbon is selectively retained by the adsorbent while the unadsorbed or raffinate mixture which comprises saturated hydrocarbons is removed from the interstitial void spaces between the particles of adsorbent and the surface of the solid adsorbent. The adsorbent is then contacted with a desorbent material which is capable of displacing the adsorbed olefinic hydrocarbons from the adsorbent.

The adsorbent can be contained in a single chamber where through programmed flow into and out of the chamber, separation of the olefinic hydrocarbons is effected. Swing-bed operational techniques where a series of adsorbent chambers are available, or simulated moving-bed countercurrent operations similar to those generally disclosed in the pattern of operations as disclosed in U. S. Pat. No. 2,985,589, can be used. In the latter method of operation, the selection of a suitable desorbent requires that it be capable of readily displacing adsorbed olefinic hydrocarbons from the adsorbent and also that the olefins in the feed mixture be able to displace the adsorbed desorbent from the adsorbent from a previous desorption step.

Charge stocks which may be used in the process contain olefins in the $C_{10}$-$C_{20}$ carbon range. Of these olefins, the $C_{10}$-$C_{15}$ range is particularly preferred. The $C_{10}$-$C_{15}$ normal mono-olefins are generally produced by catalytically dehydrogenating a $C_{10}$-$C_{15}$ normal paraffin stream. The effluent stream from the dehydrogenation step generally contains about 5 to 25% olefins and may require further processing in order to concentrate the normal olefinic hydrocarbons.

A typical example of a dehydrogenation reactor effluent composition is shown below in Table 1:

TABLE 1

DEHYDROGENATION REACTOR EFFLUENT ANALYSIS

BY GAS-LIQUID CHROMATOGRAPHY

| | Wt.% |
|---|---|
| n-$C_{10}$ paraffin | 0.1 |
| n-$C_{11}$ paraffin | 24.9 |
| n-$C_{11}$ olefin | 1.8 |
| n-$C_{12}$ paraffin | 27.8 |
| n-$C_{12}$ olefin | 2.6 |
| n-$C_{13}$ paraffin | 22.6 |
| n-$C_{13}$ olefin | 2.7 |
| n-$C_{14}$ paraffin | 12.1 |
| n-$C_{14}$ olefin | 1.7 |
| n-$C_{15}$ paraffin | 0.4 |
| Total non-normals | 3.3 |
| TOTAL | 100.0 |
| Total non-normals | 8.8 |
| Total normal olefins | 87.9 |
| Total normal paraffins | 3.3 |
| TOTAL | 100.0 |

| | Vol.% |
|---|---|
| Total olefins | 9.8 |
| Light ends | 0.2 |
| Total paraffins | 86.5 |
| Total non-normals | 3.5 |
| TOTAL | 100.0 |

The 3.5 volume percent non-normals in the above analysis are primarily aromatics. Another possible charge stock for the process would be a selected fraction from a gasoline produced by a fluid catalytic cracking unit. A typical analysis, from a 95° C cut of such gasoline is as follows:

| | Vol.% |
|---|---|
| Olefins | 25.4 |
| Paraffins and naphthenes | 72.3 |
| Aromatics | 2.3 |

The desorbents which can be used in the process of this invention will vary depending on the type of operation employed herein. In the swing-bed system in which the preferably adsorbed olefins are removed from the adsorbent by a purge stream, gaseous hydrocarbons or other type gases may be used at elevated temperatures or reduced pressures or both to effectively purge adsorbed olefins from within the sorbent. However, in other type operations which are generally operated at substantially constant pressures and temperatures, the desorbent relied upon must be judiciously selected in order that it may displace the preferred olefin adsorbed from the feed within the adsorbent without unduly preventing the feed olefins from displacing the desorbent in a following adsorption cycle. In cases where liquid phase, substantially isothermal and constant pressure operations are effected, it is preferred to use an olefinic or aromatic desorbent. The desorbent may be either a normal mono-olefin or a branched chain mono-olefin.

Process operating conditions include adsorption cycle temperatures of from about 25° C to about 150° C with desorption cycle temperatures included within the same general limits. Preferably, the desorption and adsorption cycle temperatures are the same. The pressures which may be used are not critical and can vary from below atmospheric up to many atmospheres and preferably for ease of operations below about 1000 psig. The pressures at which adsorption and desorption operations are effected preferably are substantially the same. Specifically, the adsorption and desorption temperatures and pressures are the same with liquid phase operations especially preferred.

Among important characteristics of the adsorbent used in such adsorption processes are: reduced or eliminated catalytic activity for undesired side reactions such as polymerization and isomerization, adsorptive capacity for some volume of desired olefins per volume of adsorbent, and selectivity of adsorption for both the desired hydrocarbon type and for the desired homologs of the hydrocarbon type.

Considering undesired side reactions, it is important that the highly reactive olefins are not reacted into side products which degrade the product quality and reduce the overall yield of concentrated olefins. In instances where the feed streams include both normal and isomeric olefin hydrocarbons, the isomerization effects of the copper-exchanged adsorbent are not a great impediment to the process economics where the prime consideration is the concentration of olefinic product streams. However, reduction of the polymerization activity of a copper-exchanged adsorbent is very important. The polymerization, in addition to reducing the yields of olefinic hydrocarbons also tends to degrade the adsorbent. The polymerization effects are generally considered to be primarily physical impediments which can prevent the olefinic hydrocarbons from passing into the molecular sieve adsorbent by plugging up the surface of the adsorbent and the pores present in the structure of the adsorbent.

In instances where a particular isomer of a normal olefinic hydrocarbon is desired to be separated from a feed stream which contains primarily a single olefinic isomer, the isomerization effects become equal, if not a greater problem, than the polymerization which appears to be inherently present with some isomerization activity. It is, therefore, extremely important in many instances that the catalytic activity in regard to polymerization and isomerization reactions be substantially reduced or preferably totally eliminated by proper methods of manufacture of a selected adsorbent.

While reducing the temperature of the operations of the adsorption process in which the catalytic activity is present will substantially reduce the catalytic activity because of the associated reduction in the rate of reaction, this procedure in adsorptive separation processes employing molecular sieves, in most cases, is not desirable because the reduction in temperature of the overall operations reduces the kinetic energy of the materials passing into and out of the adsorbent. This substantially reduces the rate of exchange of feed olefins into and out of the adsorbent and the desorbent material into and out of the adsorbent giving what is considered in the art as poor breakthrough fronts which results in product contamination with feed stock and relatively high requirements of adsorbent for a given through-put of olefin-containing feed stock.

In adsorptive-separation processes an important factor that is used to determine the ability of a particular adsorbent to separate components of a feed is the selectivity, (B) of the adsorbent for one component as compared to another component. This adsorbent characteristic is an especially important process consideration when there are contaminants in the feed stock which would be more selectively adsorbed than the desired hydrocarbon type. Olefin-aromatic selectivity is such an example. The selectivity (B) as used throughout this specification is defined as the ratio of the two components of the adsorbed phase over the ratio of the same two components in the unadsorbed phase at equilibrium conditions.

Selectivity is shown as Equation 1 below:

Equation 1

Selectivity $= (B) = [$(vol. percent C/vol. percent D)A$]/[$(vol. percent C/vol. percent D)U$]$ where C and D are two components of the feed represented in volume percent and the subscripts A and U represent the adsorbed and unadsorbed phases respectively. The equilibrium conditions as defined here were determined when the feed passing over a bed of adsorbent did not change composition after contacting the bed of adsorbent or in other words there was no net transfer of material occurring between the unadsorbed and adsorbed phases.

As can be seen where the selectivity of two components approaches 1.0 there is no preferential adsorption of one component by the adsorbent. As the (B) becomes less than or greater than 1.0 there is a preferential selectivity by the adsorbent of one component. When comparing the selectivity by the adsorbent of one component C over component D, a (B) larger than 1.0 indicates preferential adsorption of component C within the adsorbent. A (B) less than 1.0 would indicate that component D is preferentially adsorbed leaving an unadsorbed phase richer in component C and an adsorbed phase richer in component D. Desorbents ideally would have a selectivity equal to about 1 or slightly less than 1.

The third important adsorbent characteristic and process consideration is capacity, that is, the volume of the desired component that will be adsorbed by a given volume of adsorbent.

In order to test various adsorbents to measure the characteristics of adsorptive capacity, selectivity, and degree of catalytic activity, a dynamic testing apparatus was employed. The apparatus used consisted of an adsorbent chamber of approximately 40 cc. volume having inlet and outlet portions at opposite ends of the chamber. The chamber was contained within a temperature control means and, in addition, pressure control equipment was used to operate the chamber at a constant predetermined pressure. Attached to the outlet line of the chamber was chromatographic analysis equipment which was used to analyze the effluent stream leaving the sorbent chamber.

The actual operations used to determine the adsorbent capacity were as follows. A feed mixture containing at least one adsorbable component in a diluent component was passed through the adsorbent bed until the effluent stream leaving the adsorbent chamber, as measured by the chromatograph, was essentially the same composition as the feed stream passing into the inlet of the sorbent chamber. This indicated that the sieve has reached equilibrium, that is, the adsorbent was no longer adsorbing materials from the external phase and that there was no longer a net transfer of the material between the adsorbed phase and the external phase.

A desorbent mixture, containing an adsorbable component different from that of the feed, in a diluent component, was then passed into the adsorbent chamber at conditions to effect desorption of the previously adsorbed feed mixture components. The desorbent mixture was continuously passed into the adsorbent chamber until the effluent material, as monitored by the chromatographic equipment was substantially identical to the desorbent feed material, indicating that equilibrium conditions had been achieved. Knowing the flow rate to the chamber and the effluent composition as continuously monitored by the chromatograph, the total amount of the components adsorbed by the adsorbent from the desorbent mixture can be calculated.

In order to determine the adsorptive capacity of the sieve for components in the feed mixture, the inlet stream to the chamber was then switched from the desorbent mixture back to the feed mixture to allow feed components to displace the previously adsorbed components from the desorbent mixtures. Again using the chromatograph and knowing the flow rate and effluent composition, the volume of feed components absorbed can be calculated.

Selectivity can then be calculated using the previously mentioned equation for selectivity and the capacities determined above.

In measuring the polymerization activity of the copper-exchanged Type X zeolite, the same gas chromatographic equipment was used to determine effluent composition when a constant feed stream was passed over the adsorbent at various testing conditions. Two variations of the polymerization test can be used. In the first variation, the degree of catalytic activity may be measured by the loss of the feed olefin as detected in the effluent stream by the chromatographic equipment. The measure of polymerization is then an indirect determination, being related to the difference between the inlet and outlet olefin concentrations. The second variation is to measure the formed polymer directly in the effluent stream. This method depends on selecting a feed olefin that easily forms an identifiable polymer. Both methods can be used, with the second method being the more sensitive in determining polymerization tendencies.

The following examples are illustrative of the improved method of manufacture of the zeolite and are not to be construed as undue limitations on the inventive concepts disclosed herein.

EXAMPLE 1

In this example, the dynamic testing apparatus, as previously described, was employed to determine both the catalytic activity and the adsorptive capacity of a sodium Type X zeolite. The zeolite used was of small particle size comprising generally from 20 through 40 mesh material and was placed in the adsorbent chamber. The adsorbent chamber was maintained at 100° C, with a suitable pressure imposed on the system to maintain liquid phase operations. Alternate streams of fresh feed containing decene-1 and desorbent material containing octene-1 were passed, in a programmed manner, through the adsorbent chamber to effect generation of reproducible data. After a period of time to obtain stable operations, the adsorbent's capacity for decene-1 and octene-1 was calculated from the generated data. This adsorbent is represented by sieve A shown in Table 1. The catalytic activity of the adsorbent was then determined using the first variation of the test method as mentioned above. The same gas chromatographic equipment was also used to determine the amount of feed olefins (decene-1) which were present in an effluent stream when a constant feed stream was passed over the adsorbent at various testing temperatures. The loss of decene-1 as measured by the gas chromatographic analysis indicated the degree of catalytic activity possessed by the sodium Type X structured zeolite. This catalytic activity was thought to be primarily due to polymerization reactions of the decene-1 olefins with a small part of the decene-1 olefin being isomerized to other internal olefinic isomers. The relative activity scale used to express the catalytic activity of this adsorbent was determined by measuring the peak height on the chromatograph equivalent to 16 volume percent olefin (equal to the inlet concentration of olefin) as indicative of a zero catalytic activity. Hence, on the scale used in this example, a peak height of 16 represents 16 volume percent decene-1 present in the effluent material leaving the adsorbent chamber and represents a zero catalytic activity of the adsorbent. A peak height of 8 would represent, as measured by the chromatograph, 8 volume percent decene-1 in the effluent stream. Therefore, a peak height of 8 would represent exactly 50 percent polymerization or isomerization of the decene-1 feed component. Equation 2 below represents the formula used to determine catalytic activity of an adsorbent knowing the peak height as represented in volume percent of the decene-1 remaining in the effluent stream leaving the adsorbent chamber, Equation 2

Adsorbent Activity = 100 - 100 (P)/(16.0) where P represents the peak height of the decene-1 in the effluent stream measured on the chromatograph and where 16 represents the peak height corresponding to 16 volume percent olefins in the feed.

As will be seen in Table 2, sieve A is reactive, having a relative activity of about 4.7 percent.

EXAMPLE 2

In this example, a sodium Type X zeolite similar to that tested in Example 1 was ion-exchanged with a basic solution containing a copper compound. The basic medium copper exchange procedure was as follows: One hundred ml. of 20 through 40 mesh sodium Type X zeolite was placed in a contacting chamber. A solution containing 42 grams of $Cu(NO_3)_2 \cdot 3H_2O$ and 50 ml. of 29 wt. percent ammonium hydroxide was diluted to 600 ml. volume with dionized water. The zeolite was contacted with the basic copper exchange solution at a temperature of 25° C. at a liquid hourly space velocity of about 9. After the entire 600 ml. of solution had contacted the zeolite, the exchanged zeolite was backwashed, air equilibrated, and thereafter calcined at 500° C. for approximately 1 hour. This adsorbent was then placed in the dynamic testing apparatus to determine the olefin capacity and the relative catalytic activity of the sorbent. The results of the testing are shown in Table 2 with the adsorbent of the example labeled as sieve B.

TABLE 2

| Sieve Description | Olefin Adsorption ml./40 ml. sorbent | | Relative Activity % | Peak Height 16=100% | Exchange Medium |
|---|---|---|---|---|---|
| | Octene-1 | Decene-1 | | Decene-1 | |
| A | 3.20 | 2.72 | 4.7 | 15.3 | |
| B | 3.20 | 3.10 | 42.0 | 9.3 | Basic Medium |
| C | 2.88 | 2.70 | 0 | 16.0 | Basic Medium Followed by Hydrocarbon Treatment |

EXAMPLE 3

In this example, a sodium Type X zeolite which had been exchanged in a basic medium as described in Example 2 was contacted with a hydrocarbon-cuprous chloride mixture. The hydrocarbon contacting step was carried out using the following procedures. 100 ml. of the sieves of Example 2 (sieve B) was contacted, in a batch operation, with 240 ml. of decene-1 which had added thereto 10 grams of solid cuprous chloride. The mixture of the sieves, the decene-1 and the cuprous chloride was placed in a beaker with a magnetic stirrer at 172° C and contacted for 1 hour. The excess decene-1 and cuprous chloride was separated from the sieve mixture. The sieves were then washed with six 100 ml. aliquots of isopentane to remove excess decene-1 and unused solid cuprous chloride. The washed sieves were then purged with nitrogen and thereafter calcined at 500° C for approximately 1 hour. The sieves were then tested in the dynamic testing unit. The results of the test are reported in Table 2 above as sieve C.

It can then be seen that sieve C of Table 2 which was ion-exchanged in a basic medium with copper and subsequently treated by a cuprous chloride-hydrocarbon treatment step, was essentially unreactive as determined using this activity test method. Sieves A and B both demonstrated catalytic activity as far as isomerization and polymerization reactions were concerned.

Note also that sieve C when compared to sieve A possessed substantially the same capacities as sieve A.

General operating procedures employing the basic medium copper-exchange and hydrocarbon treatment steps require that a sodium Type X zeolite be first contacted with an aqueous solution containing a copper cation. The aqueous solution can comprise any copper salt which is reasonably soluble in water and which forms a complex in a basic ammonium medium. The exchange conditions can include temperatures from about 15° C to about 50° C for a period of time sufficient to exchange from about 10 percent to essentially all of the sodium present in the sodium Type X zeolite. After the basic aqueous ion-exchange has gone to the degree required, the sieve is then dehydrated at conditions including a temperature from about 100° C to about 500° C, depending on whether total or partial dehydration of the sieve is required. It is preferred to substantially dehydrate the zeolite without rendering its crystalline structure deformed because it has been found in most basic adsorptive separation processes that generally the greater dehydration of the adsorbent, the greater the capacity of the adsorbent for the particular species of hydrocarbon which will be adsorbed. This is generally based on the fact that the water which is driven off the zeolite during dehydration conditions is within the lattice structure of the zeolite. Consequently, total or partial dehydration renders available more free volume within the zeolite to be occupied by the particular hydrocarbon which is to be separated, thereby increasing the overall capacity of a zeolite.

After the preferred degree of dehydration has been accomplished the zeolite is cooled and thereafter is subjected to the hydrocarbon treatment step. Presently, it is not understood what exactly takes place during the hydrocarbon treatment on the copper-exchanged sieve, but the effects are noticeable, and for considerations in this disclosure, the hydrocarbon treatment step is considered to be a critical step in the manufacture of an adsorbent which has reasonable capacity for olefinic hydrocarbons and substantially no catalytic activity. The treatment step is accomplished by contacting the previously-exchanged and dehydrated molecular sieve with a hydrocarbon stream which is intimately mixed with a cuprous salt. The temperature conditions of the hydrocarbon treatment step can vary from about 50° F up to about boiling point of the particular hydrocarbon employed in the treatment step. Sufficient pressures should be maintained on the system when the hydrocarbon treatment step is taking place to maintain the hydrocarbon in substantially liquid form, should the temperature of the treatment step exceed the atmospheric boiling point of the hydrocarbon used. Hydrocarbons which may be used for the hydrocarbon treatment step include olefinic hydrocarbons or any other hydrocarbon which will form a soluble complex cuprous salt and which should necessarily be capable of passing within the pore openings of a copper-exchanged Type X zeolite. Cuprous salts which may be used in the hydrocarbon treatment preferably should include cuprous chloride. Other copper salts which may be used in the hydrocarbon treatment include cuprous bromide, cuprous cyanide, cuprous chloride, cuprous thiocyanide, etc.

EXAMPLE 4

As shown in Table 2 the cuprous chloride-hydrocarbon treatment step of Example 3 produced an adsorbent showing no apparent polymerization activity based on decene-1 disappearance. Although the relative activity as measured by the above mentioned procedure was zero, greater accuracy of the polymerization activity measurement was desired.

In order to determine more accurately the extent of the activity, the more sensitive test was employed wherein diisobutylene is used as the feed olefin and polymer is measured directly by the chromatographic equipment. In this variation of the activity test method, the determination of the dimer peak height above base line is used as the measure of polymerization. The height of a normal decane tracer above the same base line mirrors any variation in the measuring system and is determined each test.

Before being tested with this method, adsorbents made by the procedure of Example 3 were given a pre-reduction treatment to enhance the precision of the test and also to reduce possible side reactions between reduction products formed when feed olefins reduce the Cu (II) to the Cu (I) and the olefins themselves. The advantage of this pre-reduction of Cu (II) to Cu (I) is that the adsorbent is left in a cleaner state than it would be if the same reduction were done in situ by the feed olefins.

The pre-reduction treatment is as follows: the copper-exchanged Type X zeolites are saturated with $NH_3$ gas by bubbling nitrogen through 28.8% $NH_4OH$ at 25° C until $NH_3$ breaks through the bed. The nitrogen then by-passes the ammoniacal solution and the temperature of the bed-gas system is increased to 550° C and held 15 minutes at 550° C. The reduced zeolite is then cooled in a nitrogen stream before sealing in a storage container or transferring to the testing apparatus. It should be noted that over-reduction to Cu (0) enchances the catalytic activity of the adsorbent and hence defeats one of the objectives of this invention. The reduction treatment described above is sufficiently mild to effect only the reduction of Cu (II) to Cu (I).

The adsorbent of this example, identified as sieve D of Table 3 below, was prepared by the procedure of Example 3, and then pre-reduced and activity tested as described above. These results are shown in Table 3. Note that with the more sensitive test the adsorbent does again show some polymerization activity as 16.4 dimer units indicate. Adsorbent capacity was determined in the manner previously described, although with different components present in the fresh feed stream and the desorbent stream. Here diisobutylene and toluene were present in the feed instead of decene-1 and meta-xylene was present in the desorbent instead of octene-1.

TABLE 3

| Sieve description | Weight percent water added | Dimer, units | Capacity, ml./40 cc. of adsorbent | | | Selectivity, (B), | |
|---|---|---|---|---|---|---|---|
| | | | DIB | Toluene | m-xylene | DIB/toluene | DIB/m-xylene |
| D | 0 | 16.4 | 1.8 | 3.1 | 4.7 | 0.58 | 0.38 |
| E | 2.2 | 5.4 | 2.0 | 2.6 | 4.3 | 0.77 | 0.47 |
| F | 3.2 | 2.7 | 1.9 | 2.3 | 3.9 | 0.83 | 0.49 |
| G | 3.8 | 0 | 1.7 | 2.0 | 3.4 | 0.85 | 0.50 |

EXAMPLE 5

In this example the pre-reduced zeolite of Example 4 was hydrated to about 2 wt. percent water by bubbling nitrogen through water which was then passed over the reduced zeolite. This could be accomplished also by the mere exposure to atmospheric air to pick up the desired amount of water. When tested, the zeolite produced the results shown for sieve E in Table 3. Note that polymerization activity, as indicated by dimer units, has decreased from 16.4 units to 5.4 units and that selectivities for diisobutylene over toluene and m-xylene have increased from 0.58 to 0.77 and from 0.38 to 0.47 respectively. Note also that sieve E possesses about the same diisobutylene capacity as does sieve D.

EXAMPLE 6

Further hydration of the zeolite of Example 5 to about 3 wt. percent water produced the adsorbent designated as sieve F in Table 3. Polymerization activity decreased by one-half from the 5.4 dimer units of Example 5 to 2.7 dimer units. Diisobutylene selectivities over toluene and m-xylene increased and diisobutylene capacity remained essentially the same.

EXAMPLE 7

As shown in Table 3, the diisobutylene selectivities increased in Examples 5 and 6 because of decreases in capacity for both toluene and m-xylene with essentially no change in diisobutylene capacity. Sieve G represents a further hydration to about 4 wt. percent water. Here, although the polymerization activity was further decreased to essentially zero there was little decrease in selectivities and a slight loss of diisobutylene capacity. This water level would therefore appear to be about the maximum hydration level that can be used. Higher hydration levels result in loss of diisobutylene capacity with little or no improvement in diisobutylene selectivity with respect to aromatics.

In view of the advantage obtained by hydrating the zeolite to the desired water level, the importance of maintaining the proper water level during prolonged use of the zeolite is recognized. In the relatively short duration of the tests hereinbefore described, little if any dehydration of the hydrated zeolite occurs. However, in any prolonged process use of the zeolite as an adsorbent, some dehydration below the desired water level could occur. Accordingly, controlling the water content of the hydrocarbon feed mixture such that the desired degree of hydration of the zeolite adsorbent is maintained is within the process of this invention. Means of controlling the water content of hydrocarbon streams are well known to those skilled in the art of hydrocarbon processing and include, for example, employing small positive displacement pumps to inject controlled amounts of water into hydrocarbon streams.

PREFERRED EMBODIMENTS

An embodiment of this invention resides in the method of preparing an improved copper-exchanged Type X structural zeolite which method comprises the steps of contacting a sodium form Type X structured zeolite in an aqueous solution of a water-soluble copper salts maintained at basic ion-exchange conditions to effect replacement of a portion or all of the sodium within the zeolite by copper cations, heating the zeolite to dehydration conditions to effect at least a partial dehydration of the zeolite, contacting the zeolite with a mixture comprising a hydrocarbon and a cuprous salt, said hydrocarbon being capable of forming a soluble complex with the cuprous salt and of passing within the pore openings of said zeolite, contacting the zeolite with a reducing media at reducing conditions to effect at least a partial reduction of the cupric to cuprous ions, and hydrating the zeolite to the desired water content.

The preferred embodiment of this invention resides in a process for the separation of olefins from a hydrocarbon feed mixture containing olefins, saturates and contaminant aromatics which process comprises the steps of contacting said feed mixture with a bed of zeolite adsorbent at adsorption conditions to effect retention of said olefins by said absorbent, withdrawing from said bed of adsorbent a raffinate stream comprising non-retained hydrocarbons, contacting the adsorbent bed with a desorbent material at desorption conditions to effect the desorption of said olefins from said adsorbent, and withdrawing a stream containing olefins and desorbent from said adsorbent, the process further characterized in that an improvement resides in employing an improved copper-exchanged Type X structured zeolite as said adsorbent.

Other embodiments of the process of this invention reside in effecting the adsorption and desorption conditions in the liquid phase at temperatures within the range of from about 25° C to 150° C and pressures within the range of from about atmospheric to about 500 psig.

A further embodiment of the process resides in maintaining the desired adsorbent water level by controlling the water content of the hydrocarbon feed mixture.

I claim as my invention:

1. In a process for the separation of olefins from a hydrocarbon feed mixture comprising olefins, saturates, and contaminant aromatics which process comprises the steps of:
   a. contacting said feed mixture with a bed of zeolite adsorbent at adsorption conditions to effect the selective retention of said olefins by said adsorbent;
   b. withdrawing from said bed of adsorbent a raffinate stream comprising less selectively retained hydrocarbons;
   c. contacting the adsorbent bed with a desorbent material at desorption conditions to effect desorption of said olefins from said adsorbent;
   d. withdrawing a stream containing olefins and desorbent from said bed of adsorbent;

wherein an improvement comprises employing a zeolite adsorbent prepared by the steps of:
   a. contacting a sodium form Type X structured zeolite with an aqueous solution of a water-soluble copper salt at ion-exchange conditions including a basic copper-exchange medium to effect replacement of at least a portion of the sodium within the zeolite by copper;
   b. heating the zeolite at dehydration conditions to effect at least a partial dehydration of the zeolite;
   c. contacting the zeolite with a mixture comprising a hydrocarbon and a cuprous salt, said hydrocarbon being capable of forming a soluble complex with the cuprous salt and of passing within the pore openings of said zeolite;
   d. contacting the zeolite with a reducing media at reducing conditions to effect at least a partial reduction of the cupric ions to cuprous ions; and
   e. hydrating the zeolite adsorbent to the desired water content.

2. The process of claim 1 further characterized in that said hydrocarbon feed mixture contains olefins having about 10 to about 20 carbon atoms per molecule.

3. The process of claim 1 further characterized in that said adsorption and desorption conditions include temperatures within the range of from about 25° C to about 150° C and pressures within the range of from about atmospheric to about 500 psig.

4. The process of claim 1 further characterized in that said adsorption and desorption conditions are effected in the liquid phase.

5. The process of claim 1 further characterized in that said mixture comprising a hydrocarbon and a cuprous salt contains an olefinic hydrocarbon and cuprous chloride.

6. The process of claim 1 further characterized in that said desired water content of said zeolite adsorbent is from about 1.5 wt. percent to about 4.0 wt. percent water.

7. The process of claim 6 further characterized in that said desired water content of said zeolite adsorbent is maintained by controlling the water content of said hydrocarbon feed mixture.

* * * * *